Figure 1:
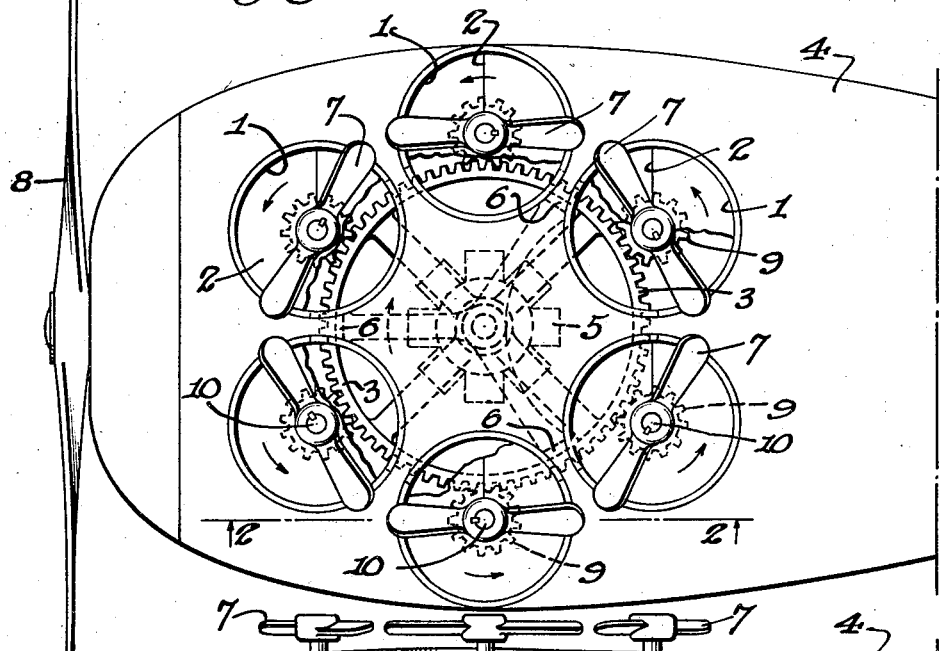
Figure 2:
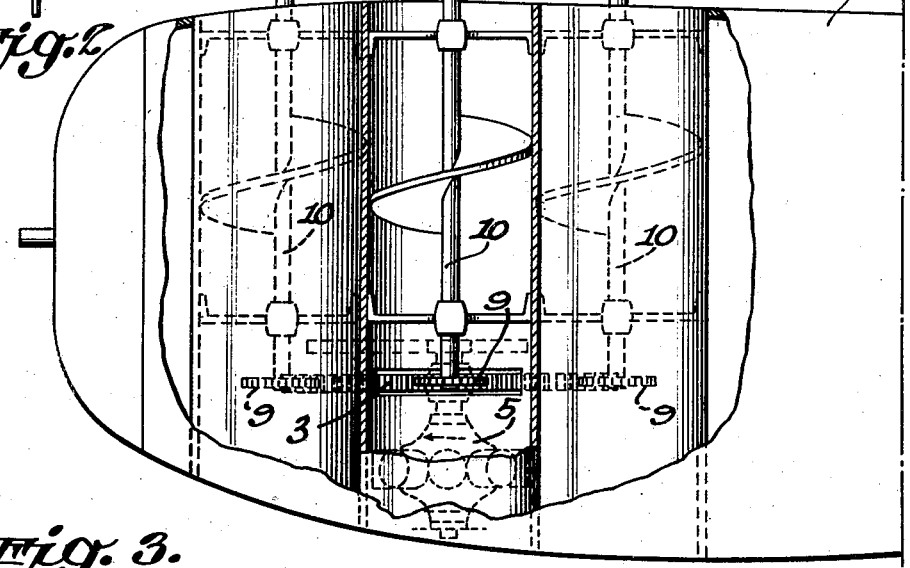
Figure 3:
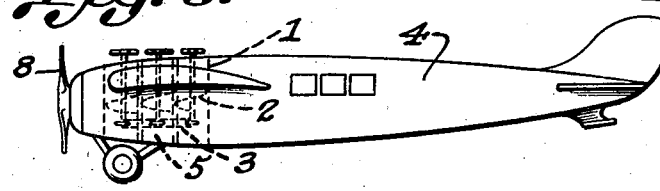

Feb. 16, 1932.  F. G. RUNGE  1,845,561
AEROPLANE LIFTING DEVICE
Filed March 19, 1931

Inventor:
Fred George Runge

Patented Feb. 16, 1932

1,845,561

UNITED STATES PATENT OFFICE

FRED GEORGE RUNGE, OF NEW YORK, N. Y.

AEROPLANE LIFTING DEVICE

Application filed March 19, 1931. Serial No. 523,843.

The invention appertains to a combined helicopter and aeroplane, having for its principal object an inside built device for launching and landing air-vehicles particularly aeroplanes.

The principal part of my invention is, that the lifting device is built on the inside of the fuselage, therefore doing away with the danger of having it seriously damaged in case of an accident.

Another important part is the combination of two or more tubes (Fig. I is showing 6) in which propellers are located, which can be put in rotation at once by a single motor.

The large gearwheel will make it unnecessary for the motor to run at full speed, therefore it will save gas and fuel and also will give the motor a longer life.

Fig. I is a top plan view, showing the tubes 1 and the propellers 2 in the inside of the fuselage 4.

In the center is the motor 5, which in connection with the large gearwheel 3, rotates the small gearwheel 9, and therefore giving the propellers 2 a high speed.

Fig. II shows a sideview also the inside of the tubes 1. On shafts 10 which run from top to the bottom of the fuselage 4 are fastened the propellers 2, which are about ⅓ of the tube in size, and have the shape of a turbine or screw. When the propellers 2 are put in operation, they will take the air in on the top and by pushing it out on the bottom will give the necessary lifting power.

In order to get more lifting power, additional propellers can be placed on top of each tube as No. 7 shown in Figs. II and III.

Fig. III shows an aeroplane (sideview) whereof from the entire lifting device, the large wheel 3, at the bottom and the additional propellers can only be seen.

What I claim is:

A helicopter comprising an annular series of vertical tubes, a helicopter propeller in each tube including its shaft and gear thereon, and a centrally disposed large driving gear in mesh with all the helicopter gears.

FRED GEORGE RUNGE.